United States Patent [19]

Marco

[11] 3,961,113
[45] June 1, 1976

[54] THERMOPLASTIC PREFORM AND HEATED MANDREL CONSTRUCTIONS

[75] Inventor: Leslie Stephan Marco, Des Plaines, Ill.

[73] Assignee: Illinois Tool Works Inc., Chicago, Ill.

[22] Filed: Mar. 3, 1975

[21] Appl. No.: 554,992

[52] U.S. Cl. .................................. 428/35; 264/92; 264/94; 264/DIG. 66; 425/387 B; 425/388; 425/393; 425/403; 425/DIG. 203; 428/98; 428/167; 428/542
[51] Int. Cl.² ............................................. B65D 21/00
[58] Field of Search ............... 428/35, 98, 167, 542; 264/92, 94, 96, DIG. 65, DIG. 66, DIG. 73, DIG. 78; 425/387 B, 388, 393, 403, DIG. 38, DIG. 203

[56] References Cited
UNITED STATES PATENTS

| | | | |
|---|---|---|---|
| 3,341,893 | 9/1967 | Edwards | 264/94 |
| 3,398,428 | 8/1968 | Fuerst et al. | 264/98 |
| 3,420,924 | 1/1969 | Mason et al. | 264/98 |
| 3,696,987 | 10/1972 | Schuff et al. | 428/315 |
| 3,719,735 | 3/1973 | Valyi | 264/92 |
| 3,770,860 | 11/1973 | Amberg et al. | 264/92 |
| 3,787,547 | 1/1974 | Stephan | 264/92 |
| 3,882,212 | 5/1975 | Edwards | 264/94 |
| 3,892,830 | 7/1975 | Hudson et al. | 264/94 |

Primary Examiner—William J. Van Balen
Assistant Examiner—William R. Dixon, Jr.
Attorney, Agent, or Firm—Edward L. Benno; Robert W. Beart

[57] ABSTRACT

A preform of generally elongate conical configuration from the open end thereof to the opposite smaller end closed, as by a rounded tip portion, with a smooth interior surface throughout the major portion thereof from the tip portion to an area adjacent the open end; and the telescopic association of the preform with a heated complementally shaped smooth surfaced mandrel; the area of the preform adjacent the open end thereof having internal circumferentially spaced surface portions providing passages therealong for vacuum withdrawal of air to conform the inner surface of the major portion of the preform in intimate thermal contact with the mandrel prior to conformation of the passaged area of the preform with the adjacent surface of the mandrel under heating of the preform to molding temperature and subsequent association of the mandrel and preform in a female mold for re-shaping the preform under applied differential pressure.

5 Claims, 5 Drawing Figures

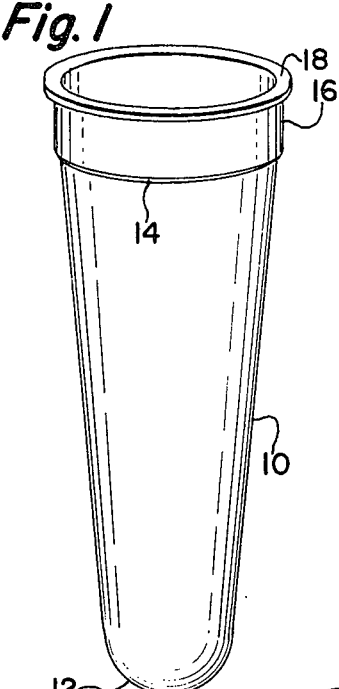
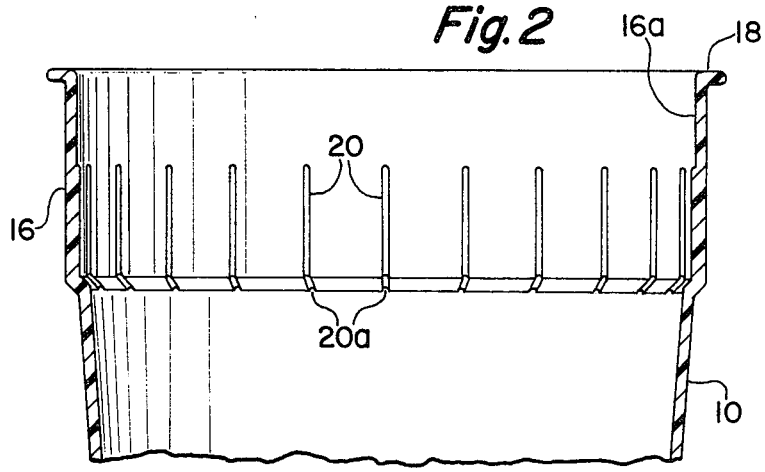
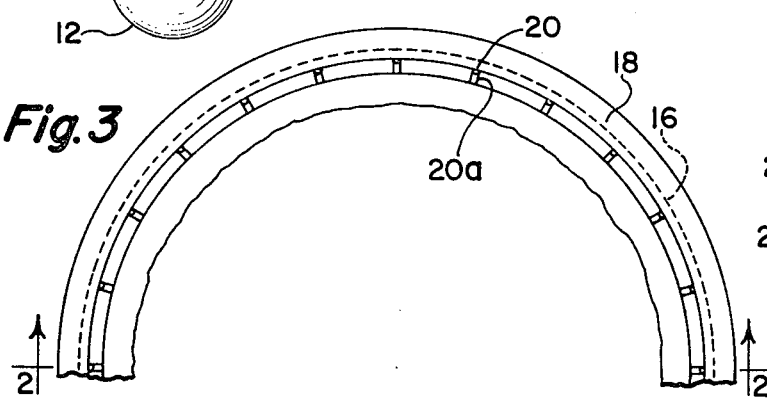
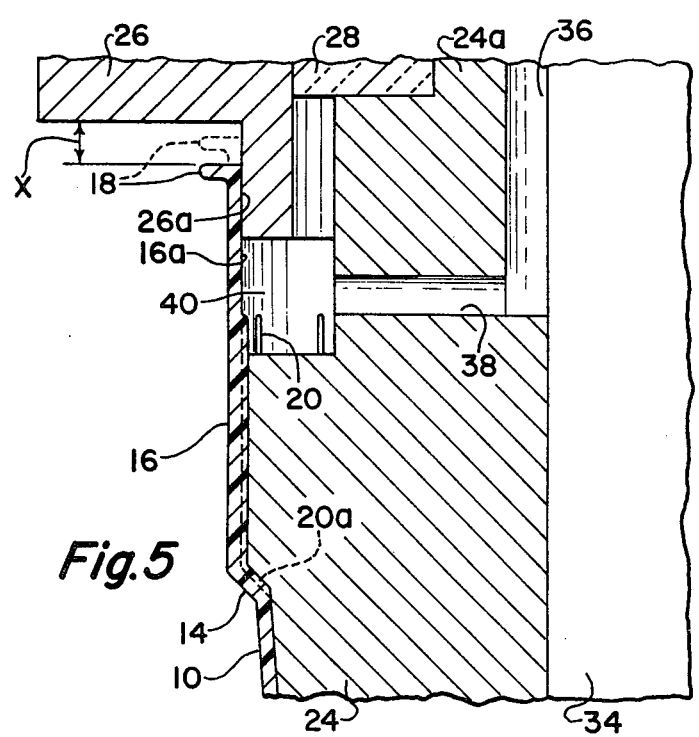

THERMOPLASTIC PREFORM AND HEATED MANDREL CONSTRUCTIONS

BACKGROUND OF THE INVENTION

In associating a parison or preform which is formed of a thermoplastic material and is at ambient temperatures, and is often of generally tapered or conical configuration, with a complementally shaped heated mandrel, one of the important considerations is to assure uniform and firm surface engagement between the preform and the surface of the mandrel with resultant good thermal contact therebetween and to maintain that thermal contact until the preform reaches molding temperatures. This is usually accomplished by vacuum holding of the preform to the mandrel which is heated to impart molding temperature to the preform in preparation for relative positioning of the associated mandrel and preform to a female mold for re-shaping the preform to the desired configuration. This is usually accomplished by applied differential pressure such as vacuum forming or blow molding. To produce a satisfactory re-shaped product, that is, one without undesirable variations in shape and thickness, the preform should be maintained in uniformly firm engagement with the mandrel surface during heating. Prior attempts have been made in this direction by sand blasting or otherwise roughening the mandrel surface for good vacuum withdrawal of air or by similarly or equivalently configuring the inner surface of the preform as it is pre-molded, and which configured inner surface portions of the preform will effectively disappear as the preform is softened under applied heat. A difficulty has been encountered in that preforms made of most known thermoplastic materials tend to initially expand and thereafter contract along the mandrel as they are heated from ambient to molding temperatures. While a substantial air seal must be maintained between the upper rim portion of the preform and the mandrel assembly, if the upper end portion is restrained against creeping along the mandrel, as by a tight surface fit or abutment with a portion of the mandrel assembly, initial heating and expansion may result in a loosening or separation of lower portions of the preform from the mandrel surface with consequent loss of good thermal contact therebetween and resultant undesirable variations in shape and thickness which may show up in the re-shaped configuration imparted by the female mold under applied differential pressure upon cessation of the applied original vacuum. Further, if the area of the preform surrounding the vacuum draw passageways softens agaisnt those passageways before complete air evacuation occurs throughout the major body areas of the preform, localized air entrapment may occur with the result that those areas will be improperly heated.

SUMMARY OF THE INVENTION

According to the present invention, the heated mandrel has a smooth exterior surface substantially throughout the extent thereof, as does the preform substantially throughout the major portion thereof from the closed end to the opposite open end. Passage means are provided between the mandrel and an interior area of the preform adjacent the open end thereof for vacuum withdrawal of air to snug the lower major portion of the preform against the mandrel surface in uniform thermal contact therewith and with the uppermost portion of the preform above the passage means engaged with the mandrel surface in air sealing relationship and for permissive movement therealong under the applied vacuum and heating conditions.

An object of the invention is to provide an improved preform configuration for vacuum association with a mandrel with heating means for the preform such that intimate thermal contact is maintained between the mandrel and preform with permissive thermal expansion of the preform along the mandrel away from the free extremity thereof whereby to prevent separation of the complemental thermal surface engagement between the mandrel and the preform.

Another object of the invention is to provide such a preform with internal surface configurations around an area adjacent the open end thereof providing with the adjacent mandrel surface vacuum egress passages and limited heat transfer for delaying heating of this area to molding temperatures and softening against the mandrel so as to insure continued air egress from between the preform and mandrel to molding temperatures and to permit expansion or creeping of this area along the mandrel and thus prevent undesirable separation of the preform therebelow from the mandrel during contact heating of the preform.

The invention further aims to so associate a generally conical preform with a complementally shaped heated mandrel in thermal contact therewith such that good contact heating of the preform to molding temperatures will be maintained as a vacuum is drawn between the preform and the mandrel near the upper end of the preform and as longitudinal expansion of the preform along the mandrel occurs to avoid any tendency of the preform to soften agaisnt the vacuum drawing passageways of the mandrel before the entire portion of the preform below its upper edge is heated to molding temperatures.

The above and other objects of the invention will in part be obvious and will be hereinafter more fully pointed out in the detail description of the accompanying drawings in which FIG. 1 is a perspective view of a preform;

FIG. 2 is an enlarged fragmentary vertical section through the open end portion of the preform;

FIG. 3 is a fragmentary top plan view of FIG. 2;

FIG. 4 is a vertical section through an associated mandrel and preform, with a female mold shown fragmentarily in broken lines, and FIG. 5 is an enlarged fragmentary quarter section of the associated mandrel and open end portion of the preform to more clearly show the air egress passageways.

DETAILED DESCRIPTION

With reference to the accompanying drawing, and particularly FIG. 1, the preform includes a body portion 10 of generally conical configuration tapering from the upper end thereof downwardly to a smaller closed end or tip portion 12 of rounded or semi-spherical configuration. The upper end of the body portion merges with an outwardly and upwardly inclined short wall portion 14 providing stacking shoulder means for groups or packages of nested preforms for storage or shipment at ambient temperatures. The stacking wall 14 merges with an upstanding substantially cylindrical wall 16 which defines the open end portion of the preform and terminates in a radially outwardly extending rim or flange 18. With reference to FIGS. 2 and 3, the upper portion 16 is provided with internal ribs 20 initially providing passages therebetween as do continuations 20a of the ribs extending along the inner surface of the wall portion 14 and terminating at the inner surface of the body portion which is smooth throughout the major portion thereof from the tip portion 12 to the area adjacent the upper end of the preform including the ribs 20 which terminate below the upper edge of the preform, thus leaving a portion 16a which will contact the unheated holder portion of a mandrel assembly as will be pointed out hereinafter. The preform is of suitable thermoplastic material, such as polyethylene, polystyrene; and is formed by suitable known molding techniques, such as injection molding.

With reference to FIGS. 4 and 5, a mandrel assembly of a tapered mandrel 24 and essential mounting means therefor are illustrated, it being understood that there will be provided plural mandrel assemblies of mandrels and holding or mounting means arranged on a rotating turret or other conveying means for moving each mandrel to position for receiving an ambient temperature preform which is heated by the mandrel to molding temperatures during further movement thereof, and then the mandrel assembly and heated preform are associated with a female mold in which the heated preform is re-shaped under applied differential pressure. The mandrel holder 26 is internally recessed to receive an insulating sleeve means 28 which, in turn, receives the inwardly offset end portion 24a of the mandrel with a snap ring 30 securing the mandrel to the insulator. One or more set screws 32 secure the insulator and mandrel 24 in the holder 26. The mandrel 24 is formed of a material having high thermal conductivity, such as aluminum, and is centrally recessed to receive an electrical heater 34 extending therethrough substantially to the reduced and rounded end with the upper portion 34a spaced from the adjacent portion of the holder, the insulator portion 28a and the inwardly offset portion 24a of the mandrel to provide passage means 36 connected to a source of vacuum (not shown) for drawing air from between the preform 10 and mandrel 24 as will be pointed out hereinafter. The passage means 36 communicates with lateral passages 38 leading to a manifold annular passage means 40 adjacent the upper end of the mandrel. The mandrel 24 is tapered complementally with respect to the major interior smooth body surface of the preform 10 and this tapered working surface snugly complements and engages the inner rounded surface of the preform tip portion 12 and the inner surface of the preform body portion 10 up to the stacking shoulder 14 and throughout this area the surfaces of the preform and mandrel are smooth to be maintained in uniform thermal contact with one another. The ribs 20, 20a initially space the intermediate surfaces of the preform from the mandrel 24 to provide passages therebetween communicating with the manifold passage means 40, the ribs 20 extending along the preform to approximately the level of the lateral passages 38. Thereabove, the inner surface of the preform continues as a smooth surface throughout the portion 16a of the cyclindrical portion 16 to engage the adjacent longitudinal surface 26a of the holder 26. This surface is to be considered as a remnant mandrel working surface inasmuch as it provides a mating surface for the upper end portion of the preform.

Upon initial application of the preform to the mandrel assembly, the inner surface of the body portion 10, as well as that of the tip portion 12, will be in smooth surface contact with the complemental working surface of the mandrel. The ribs 20, 20a will engage the mandrel surface and space the intermediate surface portions of the preform therefrom and the surface portion 16a will be in surface and substantial air sealing contact with the working surface 26a of the holder in the full line position shown in FIG. 5. Vacuum is drawn through the passages 36, 38, 40 to withdraw air from between the mandrel and preform and maintain the above described relative positioning for uniform thermal surface contact of the body portion 10 and tip portion 12 with the working surface of the mandrel. The heater 34 conductively heats the mandrel 24 which in turn conductively heats the preform surfaces in contact therewith to molding temperatures. During this heating operation, the ribs 20, 20a will delay heating of this upper area of the preform, acting somewhat as a heat delaying insulator means, and allowing time for the vacuum draw to insure complete air evacuation from between the preform body and the mandrel 24 as the preform body begins to soften. The holder 26 is maintained in a relatively cool condition by the insulation 28 so that an effective air seal can be maintained along the surface 26a acting as a remnant working surface or working continuation of the mandrel. In this initial positioning, the top edge of the preform defined by the flange 18 will be spaced a distance X (see FIG. 5) from the adjacent lateral surface of the holder. Upon initial heating, the ribs 20, 20a will maintain the vacuum draw to the interior surface area of the preform and the preform will be conformed to the mandrel surface and will longitudinally expand along the surface 26a to an approximate dotted line position of the flange 18 (see FIG. 5). This will counteract tendency for the lower portion of the preform to move in the opposite direction, that is, a direction tending to separate the same from uniform thermal surface contact with adjacent portions of the mandrel. As heating continues and as the preform softens, the last area to soften and be vacuum drawn against the mandrel will be that area below manifold 40 and between the ribs 20, 20a. Thus, irregularities in the heated preform are substantially avoided. Lastly, the heated preform and mandrel are clampingly associated with a female mold, designated 50 in FIG. 4, and the vacuum discontinued. Air under pressure is then delivered through the same passages for conforming the preform to the internal configuraton of the female mold.

In reductions to practice of the invention it has further been found that the ribs 20, 20a greatly aid in avoiding trapped air upon the initial application of the preform 10 to a mandrel assembly.

Having described the invention, it will be apparent to those skilled in the art that changes can be made within the spirit and scope of the claims.

I claim:

1. A plastic preform for application to a complementally shaped smooth surfaced heated mandrel of the type used in plastic molding machines for reshaping the preform under heat and applied differential pressure; and comprising a body portion of generally conical configuration from an open upper end to a closed smaller end and with a major smooth interior surface from the closed end to an area adjacent the open end, said area having internal spaced surface portions providing passages therealong for upward withdrawal of air from between the mandrel surface and the smooth interior surface of the preform body portion for uniform conformation of the smooth interior surface of the preform to the mandrel surface, and said preform body portion having an internal surface portion around the open end and close to the passaged area for contacting an adjacent remnant surface of the mandrel with permissive relative sliding movement therebetween under continued application of heat and differential pressure without reactive tendency for the major portion of the body portion to separate from the mandrel surface.

2. A preform as claimed in claim 1, wherein the passaged area of the preform is provided with spaced ribs to contact the adjacent mandrel surface and provide the passages therebetween.

3. A preform as claimed in claim 2, wherein the preform is provided with an outward inclined wall surface adjacent the bottom of the passaged area to present a stacking shoulder.

4. A preform as claimed in claim 3, wherein the ribs extend across the interior surface of the stacking shoulder.

5. A preform as claimed in claim 4, wherein the ribs extend substantially longitudinally of the preform axis across the passaged area and the interior surface of the stacking shoulder.

* * * * *